(12) United States Patent
Chong et al.

(10) Patent No.: US 10,637,326 B2
(45) Date of Patent: Apr. 28, 2020

(54) VARIABLE GEAR RATIO ELECTRICAL MACHINE

(71) Applicant: ROLLS-ROYCE PLC, London (GB)

(72) Inventors: Ellis F H Chong, Derby (GB); Brian E Simmers, Derby (GB)

(73) Assignee: ROLLS-ROYCE plc, London (GB)

( * ) Notice: Subject to any disclaimer, the term of this patent is extended or adjusted under 35 U.S.C. 154(b) by 593 days.

(21) Appl. No.: 15/298,941

(22) Filed: Oct. 20, 2016

(65) Prior Publication Data

US 2017/0141648 A1    May 18, 2017

(30) Foreign Application Priority Data

Nov. 16, 2015 (GB) .................................. 1520131.2

(51) Int. Cl.
| | | |
|---|---|---|
| H02K 16/02 | (2006.01) |
| H02K 7/116 | (2006.01) |
| F02C 6/20 | (2006.01) |
| F02C 7/36 | (2006.01) |
| H02K 1/27 | (2006.01) |
| H02K 7/08 | (2006.01) |
| H02K 7/18 | (2006.01) |
| H02K 41/02 | (2006.01) |

(Continued)

(52) U.S. Cl.
CPC ............. *H02K 7/116* (2013.01); *F02C 6/203* (2013.01); *F02C 7/36* (2013.01); *H02K 1/2706* (2013.01); *H02K 1/2786* (2013.01); *H02K 1/2793* (2013.01); *H02K 7/08* (2013.01); *H02K 7/1823* (2013.01); *H02K 16/02* (2013.01); *H02K 41/02* (2013.01); *H02K 19/06* (2013.01); *H02K 19/103* (2013.01)

(58) Field of Classification Search
CPC ....................................................... H02K 16/02
USPC ................................................... 310/114–119
See application file for complete search history.

(56) References Cited

U.S. PATENT DOCUMENTS

| | | |
|---|---|---|
| 6,794,781 B2 | 9/2004 | Razzell et al. |
| 8,169,116 B2 † | 5/2012 | Oya |

(Continued)

FOREIGN PATENT DOCUMENTS

| | | |
|---|---|---|
| EP | 2390994 A1 † | 11/2011 |
| EP | 2481953 A2 | 8/2012 |

(Continued)

OTHER PUBLICATIONS

Mar. 27, 2017 Extended Search Report issued in European Patent Application No. 16194712.2.

(Continued)

*Primary Examiner* — Jeremy A Luks
(74) *Attorney, Agent, or Firm* — Oliff PLC

(57) ABSTRACT

An electrical machine including a moveable permanent magnet configured to generate a first magnetic field. A stator including windings configured to excite a second magnetic field. A moveable inter-pole component located between the permanent magnet component and the stator, the inter-pole component comprising an array of magnetic inter-pole pieces. The speed of movement of the inter-pole component is controlled to set a magnetic gear ratio between the first and second magnetic fields. Also a gas turbine engine, propulsor or thruster incorporating the electrical machine.

19 Claims, 4 Drawing Sheets

(51) Int. Cl.
H02K 19/06 (2006.01)
H02K 19/10 (2006.01)

(56) References Cited

U.S. PATENT DOCUMENTS

| | | | | |
|---|---|---|---|---|
| 8,183,802 | B2* | 5/2012 | Quere | H02K 9/06 |
| | | | | 310/112 |
| 8,358,044 | B2 | 1/2013 | Waszak et al. | |
| 8,430,782 | B2† | 4/2013 | Akutsu | |
| 8,546,988 | B2* | 10/2013 | Bright | H02K 51/00 |
| | | | | 310/103 |
| 8,593,026 | B2* | 11/2013 | Montgomery | H02K 51/00 |
| | | | | 310/103 |
| 8,598,759 | B2* | 12/2013 | Edwards | H02K 49/06 |
| | | | | 310/103 |
| 8,624,415 | B2* | 1/2014 | Koenig | H02K 16/02 |
| | | | | 290/52 |
| 8,653,677 | B2* | 2/2014 | West | F02B 37/00 |
| | | | | 290/1 C |
| 9,190,892 | B2† | 11/2015 | Anthony | |
| 2011/0156518 | A1* | 6/2011 | Bright | H02K 19/106 |
| | | | | 310/103 |
| 2011/0163623 | A1* | 7/2011 | Rens | H02K 7/11 |
| | | | | 310/114 |
| 2012/0094555 | A1* | 4/2012 | Calverley | B63H 23/24 |
| | | | | 440/6 |
| 2014/0217838 | A1* | 8/2014 | Bright | H02K 19/106 |
| | | | | 310/48 |
| 2014/0306566 | A1* | 10/2014 | Edwards | H02K 7/11 |
| | | | | 310/103 |
| 2014/0328668 | A1* | 11/2014 | Anthony | F02C 3/107 |
| | | | | 415/10 |

FOREIGN PATENT DOCUMENTS

| | | |
|---|---|---|
| EP | 2644946 A1 † | 10/2013 |
| EP | 2660440 A2 | 11/2013 |
| GB | 2437568 A | 10/2007 |
| GB | 2493484 A | 2/2013 |
| WO | 2010/142962 A2 | 12/2010 |
| WO | 2010142962 A2 † | 12/2010 |
| WO | 2014/128985 A1 | 8/2014 |
| WO | 2015/121647 A1 | 8/2015 |
| WO | 2015121647 A1 † | 8/2015 |

OTHER PUBLICATIONS

Fukuoka Michinari et al., "A Novel Flux-Modulated Type Dual-Axis Motor for Hybrid Electric Vehicles", IEEE Transactions on Magnetics, IEEE Service Center, vol. 50, No. 11, pp. 1-4, 2014.
Bai Jingang et al., "Characteristic Analysis and Verification of the Magnetic-Field-Modulated Brushless Double-Rotor Machine", IEEE Transactions on Industrial Electronics, IEEE Service Center, vol. 62, No. 7, pp. 4023-4033, 2015.
Mar. 29, 2016 Search Report issued in Great Britain Patent Application No. 1520131.2.
Feb. 21, 2020 Office Action issued in European Patent Application No. 16194712.2.
Fukouoka et al., "A Novel Flux-Modulated Type Dual-Axis Motor for Hybrid Electric Vehicles," IEEE Transactions on Magnetics, vol. 50, No. 11, Nov. 2014, 4 pages.†
Bai et al., "Characteristic Analysis and Verification of the Magnetic-Field-Modulated Brushless Double-Rotor Machine," IEEE Transactions on Industrial Electronics, vol. 62, No. 7, Jul. 2015, 11 pages.†

\* cited by examiner
† cited by third party

VARIABLE GEAR RATIO ELECTRICAL MACHINE

The present disclosure concerns an electrical machine having a variable gear ratio. It particularly concerns a permanent magnet electrical machine with magnetic gearing.

Electrical machines, in particular permanent magnet electrical machines, are known. A typical rotating electrical machine includes a stationary stator having a magnetic core and one or more electrical windings. The machine also includes a rotor which includes an annular array of permanent magnets, mounted to or preferably embedded in the surface of the rotor closer to the stator. It is common for the stator to be radially outside the rotor but it is also common for the rotor to be radially outside the stator.

U.S. Pat. No. 8,358,044 discloses an electrical machine of this basic type in which the rotor is outside the stator. In the air gap between the rotor and stator is positioned an annular array of stationary iron pole-pieces. The pole-pieces act to magnetically couple the rotor poles and stator windings in a fixed gear ratio.

One disadvantage of the electrical machine disclosed in U.S. Pat. No. 8,358,044 is that it can only be optimised for one operational condition, in terms of speed and torque. At high speed operation the operational efficiency may be significantly reduced. Large frequency losses in the electrical machine and associated power electronics may also cause problems with thermal management.

According to a first aspect of the present invention there is provided an electrical machine comprising:
 a moveable permanent magnet component configured to generate a first magnetic field;
 a stator comprising windings configured to excite a second magnetic field; and
 a moveable inter-pole component located between the permanent magnet component and the stator, the inter-pole component comprising an array of magnetic inter-pole pieces; wherein the speed of movement of the inter-pole component is controlled to set a magnetic gear ratio between the first and second magnetic fields.

Advantageously the electrical machine has a variable gear ratio and so can be dynamically optimised for current operating conditions. The gear ratio is varied by the movement of the inter-pole component modulating the spatial magnetic field between the permanent magnet component and the stator. Advantageously the electrical machine is torque dense but relatively small. Advantageously the electrical machine operates in a wider speed range than known electrical machines having fixed gear ratios. Advantageously the electrical machine can have a higher torque capability at lower speeds than known electrical machines.

The electrical machine may be configured as a generator. Alternatively the electrical machine may be configured as a motor. Advantageously the physical arrangement of the electrical machine is the same when configured as a generator or as a motor.

The inter-pole pieces may comprise soft iron. Advantageously this is an efficient and well understood magnetic material. The inter-pole pieces may form a regular array. Advantageously the modulation of the spatial magnetic field is therefore regular and predictable. Advantageously the modulation is not dependent on the relative orientation or position of the permanent magnet component, inter-pole component and stator.

The permanent magnet component may comprise an array of magnets configured to generate the first magnetic field. The magnets may comprise permanent magnets. Alternatively the magnets may comprise electromagnets. The magnets may comprise one or more permanent magnets and one or more electromagnets. The magnets may comprise a regular array.

An output of the stator may be coupled to power electronics and may be arranged to provide drive to the inter-pole component. Advantageously an external power source is not required to drive the inter-pole component, at least during generating mode.

A drive shaft may be configured to drive the permanent magnet component. A drive motor may be configured to drive the inter-pole component. Advantageously the drive shaft may comprise a shaft of an engine or marine propulsor to which the electrical machine is coupled. Advantageously the drive motor may be a servo motor or electrical motor. The drive motor may be coupled to the inter-pole component via bearings and/or mechanical gears. Alternatively the drive motor may be directly coupled to the inter-pole component.

The electrical machine may comprise a controller configured to control the speed of movement of the inter-pole component to set the magnetic gear ratio. The controller may only control the electrical machine. Alternatively the controller may form part of an engine controller and/or may have other functions.

The electrical machine may comprise a radial flux machine. The permanent magnet component therefore comprises a permanent magnet rotor and the inter-pole component comprises an inter-pole rotor. The radial flux machine may have the stator located radially inside the permanent magnet rotor. Alternatively the radial flux machine may have the stator located radially outside the permanent magnet rotor. Advantageously the radial flux electrical machine is simpler, in either configuration, than known electrical machines having variable gear ratio because there are only two rotating components.

The electrical machine may comprise an axial flux machine. The permanent magnet component therefore comprises a permanent magnet rotor and the inter-pole component comprises an inter-pole rotor. The axial flux machine may have the stator located axially adjacent to the permanent magnet rotor.

Where the electrical machine comprises a radial flux or axial flux machine, the permanent magnet rotor may comprise an annular array of magnets configured to generate the first magnetic field. Where the electrical machine comprises a radial flux or axial flux machine, the stator may comprise an annular array of windings. Where the electrical machine comprises a radial flux or axial flux machine, the inter-pole rotor may comprise an annular array of inter-pole pieces. Advantageously the permanent magnet rotor, inter-pole rotor and stator form nested annular components. The magnets, windings and inter-pole pieces form complementary arrays to generate and modulate the magnetic fields. The arrays may be regular.

The electrical machine may comprise a linear electrical machine. The permanent magnet component may comprise a permanent magnet shaft configured for lateral translation. The permanent magnet component may comprise a linear array of magnets configured to generate the first magnetic field. The stator may comprise a linear array of windings configured to generate the second magnetic field. The inter-pole component may comprise an inter-pole shaft configured for lateral translation. The inter-pole component may comprise a linear array of inter-pole pieces configured to modulate the magnetic field patterns. The permanent magnet component and inter-pole component may each be configured to move in a linear manner, for example laterally. Advantageously such a linear machine is suitable where rotation is constrained or inappropriate but translation is available.

The present invention also provides a gas turbine engine incorporating an electrical machine as described. Advantageously the gas turbine engine may be suitable for aero applications. The present invention also provides a propulsor or thruster incorporating an electrical machine as described. Advantageously the propulsor or thruster may be suitable for marine applications.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
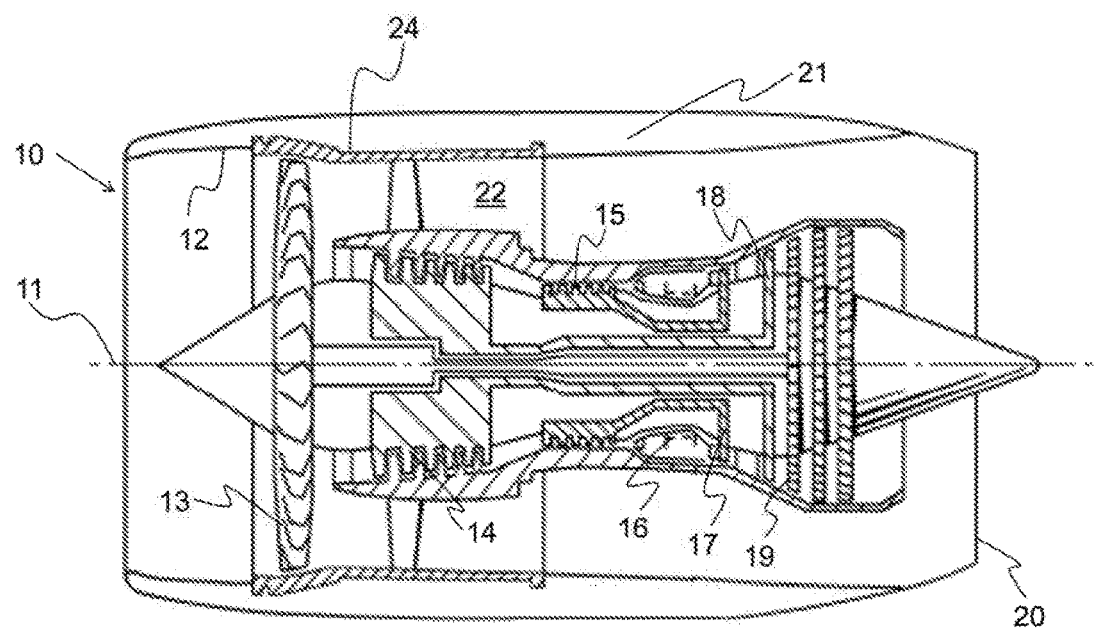
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Electrical machines can be used for a variety of purposes in a gas turbine engine 10. For example an electrical machine may be mechanically coupled to one of the interconnecting shafts to extract electrical power which can be supplied to other electrically driven components. The electrical power may be supplied to oil or fuel pumps; actuators for variable geometry vanes; actuators for a variable area exhaust nozzle 20; an electric thrust reverser mechanism or any other electrical load in the engine 10. Where the gas turbine engine 10 is used to power an aircraft the electrical machine may supply power to aircraft systems including cabin air blowers and entertainment systems.

Electrical machines may function as generators, with mechanical input from a shaft of the engine 10, or as motors, for example for distributed propulsion.

Figure 2:
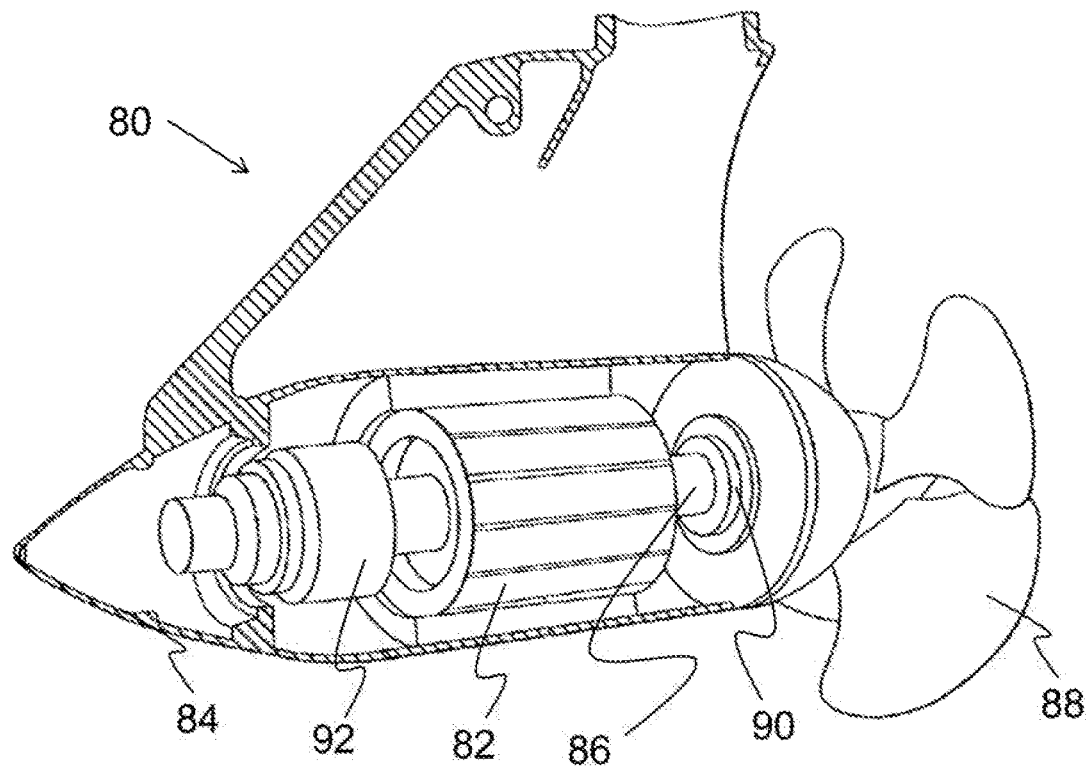
FIG. 2 is a perspective part-sectional side view of a marine propulsor.

FIG. 2 shows an exemplary marine propulsor 80, in this case a marine azimuthing podded propulsion system (or pod). Pods are often used to propel large marine vessels such as cruise ships, naval vessels and tankers. Such pods are relatively self-contained units that may be suspended beneath a ship's hull and may be independently rotated through 360 degrees to provide the required thrust in any direction. Pods maximize manoeuvrability and enable large vessels to manoeuvre into relatively small ports without the need for tug assistance. Pods are easily installed and provide a high degree of layout flexibility because of the relative independence of their location relative to the primary power plant of the vessel.

A pod 80 can be configured to include an electric motor 82 enclosed within a hydrodynamically optimised nacelle 84. The electric motor 82 directly drives a shaft 86 housed within the nacelle 84, subsequently driving a propeller 88 located outside the sealed pod 80. To enable the shaft 86 to rotate freely it is supported by a drive end radial bearing 90 located at the end of the shaft 86 closer to the propeller 88 and a non-drive end bearing assembly 92, providing combined radial and thrust bearing functionality, located at the opposite end of the shaft 86.

The hydrodynamic optimisation of the pod 80 is aided by designing the electric motor 82 to be as torque dense as possible, for example through the use of a magnetically geared machine.

FIG. 2 illustrates one implementation of marine propulsion using an electric motor 82. Marine propulsors 80 may also be implemented as azimuth thrusters in which the electric motor 82 is housed inside the marine vessel's hull. The connection to the propeller 88, which may be open or ducted and is mounted outside of the hull, is via a Z-drive arrangement with horizontal mounting of the electric motor 82 within the hull or via an L-drive arrangement with the electric motor 82 vertically mounted within the hull. In either configuration, the accommodation of the electric motor 82 is simplified by ensuring it is as torque dense as possible, for example through the use of a magnetically geared machine. As with the pods 80, the azimuth thrusters may be independently rotated through 360 degrees to provide the required thrust in any direction.

Alternatively the propeller 88 may be located towards the aft of the vessel and may be driven by a shaft 86 through the hull which may be horizontal or offset slightly from the horizontal by a small forward or aft rake angle. The shaft 86 may be driven by a mechanical coupling to an engine, normally via a step-down gearbox, or by an electric motor 82 either via a step-down gearbox or by direct coupling.

Particularly in the latter case, a torque-dense electric motor design, such as a magnetically geared machine, is desirable to ensure the large amount of torque needed to transfer the required power at low rotational shaft speed can be accommodated.

Figure 3:
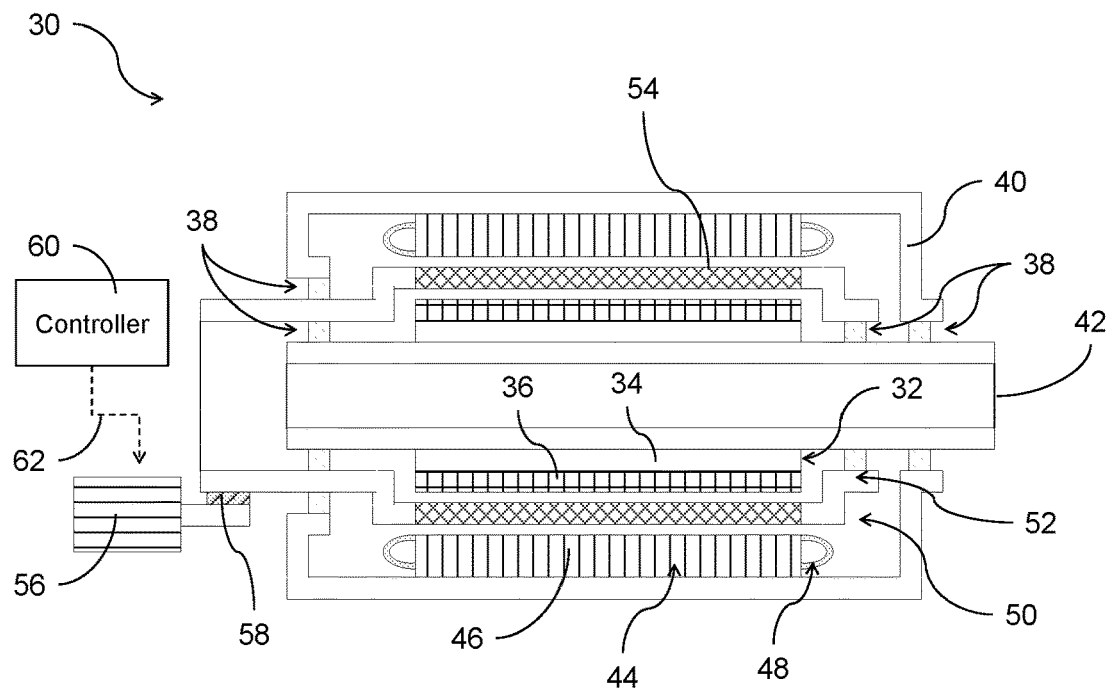
FIG. 3 is a schematic cross-section of an electrical machine according to the present invention.

An exemplary electrical machine 30 is shown in FIG. 3. The electrical machine 30 is a radial flux machine and includes a permanent magnet rotor 32. The permanent magnet rotor 32 comprises a rotor core 34 and permanent magnets 36 mounted on or in the surface of the permanent magnet rotor 32. The rotor core 34 may comprise soft iron. The permanent magnets 36 are arranged as an annular array with their north and south poles alternately facing radially outwards. The permanent magnets 36 are configured and arranged to generate a first magnetic field. The permanent magnet rotor 32 may be mounted, via bearings 38, in a housing 40.

The permanent magnet rotor 32 may be mechanically coupled to a drive shaft 42. When the electrical machine 30 is configured as a generator, the drive shaft 42 supplies motive power to rotate the permanent magnet rotor 32. The drive shaft 42 may be coupled to a shaft of the gas turbine engine 10 or the marine propulsor 80. When the electrical machine 30 is configured as a motor, the drive shaft 42 is driven by the electrical machine 30 and transfers the output mechanical power to a component of the gas turbine engine 10 or marine propulsor 80, for example to start the engine 10.

The electrical machine 30 also includes a stator 44. The stator 44 is formed as a stator core 46 and a plurality of windings 48. As shown in FIG. 3 the stator 44 is annular and is located radially outside the permanent magnet rotor 32 with an air gap 50 radially therebetween. The windings 48 may form an annular array and may, for example, be arranged for three-phase current. The windings 48 are configured and arranged to generate a second magnetic field.

Located within the air gap 50 is an inter-pole rotor 52 which includes inter-pole pieces 54. The inter-pole pieces 54 are, for example, soft iron pole pieces and may be arranged as an annular array. The inter-pole rotor 52 is configured and arranged to rotate independently of the permanent magnet rotor 32. The inter-pole rotor 52 may be driven by a drive motor 56. The drive motor 56 may be a servo motor coupled to the inter-pole rotor 52. Optionally the drive motor 56 may be coupled to the inter-pole rotor 52 via mechanical gears and/or bearings 58. In this manner the power density of the drive configuration can be optimised. Alternatively the drive motor 56 may be an electrical motor.

Optionally there may be a controller 60 which is configured to control the rotational speed of the inter-pole rotor 52. For example the controller 60 may generate control signals 62 which are sent to the drive motor 56 to cause the inter-pole rotor 52 to rotate at the desired speed.

In operation the rotation of the inter-pole rotor 52 is controlled to modulate the magnetic flux of the electrical machine 30. Different harmonic magnetic field patterns are therefore established which couple to the pole pairs of the permanent magnet rotor 32. The different patterns equate to different gear ratios. This enables a higher effective pole number to be established than would otherwise be possible in the same physical space. Thus an electrical machine 30 having the variable gear ratio of the present invention can be smaller for a wider speed range than is possible using known arrangements. Alternatively an electrical machine 30 according to the present invention can have a higher torque capability at lower speeds. Combinations of these benefits may be obtained by design choice of the size of the electrical machine 30, number of rotor poles (permanent magnets 36), number of windings 48, number of inter-pole pieces 54 and relative rotational speeds of the permanent magnet rotor 32 and inter-pole rotor 52.

In motor mode the stator 44 is electrically excited by three-phase windings 48 at a frequency to produce the second magnetic field. The second magnetic field rotates at a rotational speed and has a number of magnetic poles. The rotating second magnetic field is spatially modulated by the inter-pole pieces 54. The second magnetic field thus interacts with the first magnetic field generated by the permanent magnet rotor 32 to generate torque.

In generator mode the stator 44 is electrically excited by three-phase windings 48 at a frequency to produce the second magnetic field. The second magnetic field rotates at a rotational speed and has a number of magnetic poles. The rotating second magnetic field is spatially modulated by the inter-pole pieces 54. The second magnetic field thus interacts with the first magnetic field generated by the permanent magnet rotor 32 to react to torque applied externally via the drive shaft 42.

By changing the rotational speed of the inter-pole rotor 52 the effective gear ratio between the first and second magnetic fields is changed. Beneficially the electrical machine 30 can be dynamically optimised to current operating conditions whereas a conventional electrical machine having a fixed gear ratio can only be optimised for one operating condition and operates less efficiently at other operating conditions.

The gear ratio is given by $$\omega_r = -\frac{\omega_s p_s}{p_r} \pm \frac{\omega_i N_i}{p_r}$$

where $\omega$ is the speed of rotation; p is the number of poles; $N_i$ is the number of inter-pole pieces; the suffix s refers to the stator 44; the suffix r refers to the permanent magnet rotor 32; and the suffix i refers to the inter-pole rotor 52. The inter-pole rotor 52 can rotate in either direction, as indicated by the addition and subtraction options in the formula.

Advantageously the power input required to maintain the gear ratio is low because there is no torque opposition to overcome in the inter-pole rotor 52. Although additional power will be required to change the gear ratio this is a transient power input. Any penalty in power input is expected to be exceeded by the efficiency improvement from the capability to change the gear ratio to optimise the performance of the electrical machine 30.

Figure 4:
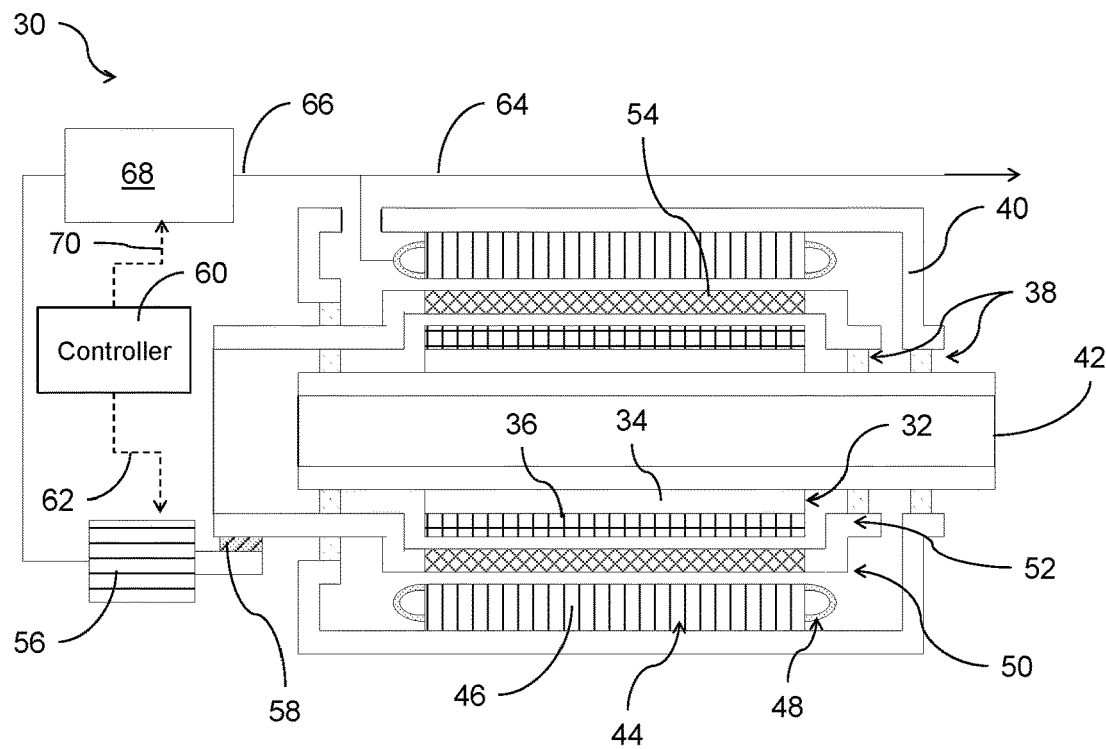
FIG. 4 is a schematic cross-section of an electrical machine according to the present invention.

FIG. 4 is similar to FIG. 3 and shows an optional feature of the electrical machine 30 of the present invention particularly when operated as a generator. The electrical output from the stator windings 48 is delivered as power output, for example three-phase power output, as shown by line 64. This is the same as occurs in FIG. 3 but was not illustrated. In addition, when operated as a generator a small proportion of the power output 64 is diverted to be power feedback 66. The power feedback 66 is delivered to a power electronics converter 68 which in turn powers the drive motor 56 to rotate the inter-pole rotor 52. Advantageously no external power source is therefore required to power the drive motor 56.

When operated as a motor the electrical machine 30 may enter a regenerative mode, for example during braking. Thus power may be generated by the electrical machine 30 despite being in a motoring mode. This power output 64 may be delivered as power feedback 66 to the converter 68 to power the drive motor 56.

The power electronics converter 68 may function as the controller 60 or may be controlled by the controller 60. Where the converter 68 is controlled by the controller 60, control signals 70 may be sent from the controller 60 to the converter 68. Control signals 70 may be in addition to or instead of the control signals 62 sent to the drive motor 56. The electrical machine 30 also enables a lower frequency main converter to be used to condition power to or from the stator windings 48 which consequently reduces the converter losses.

Figure 5:
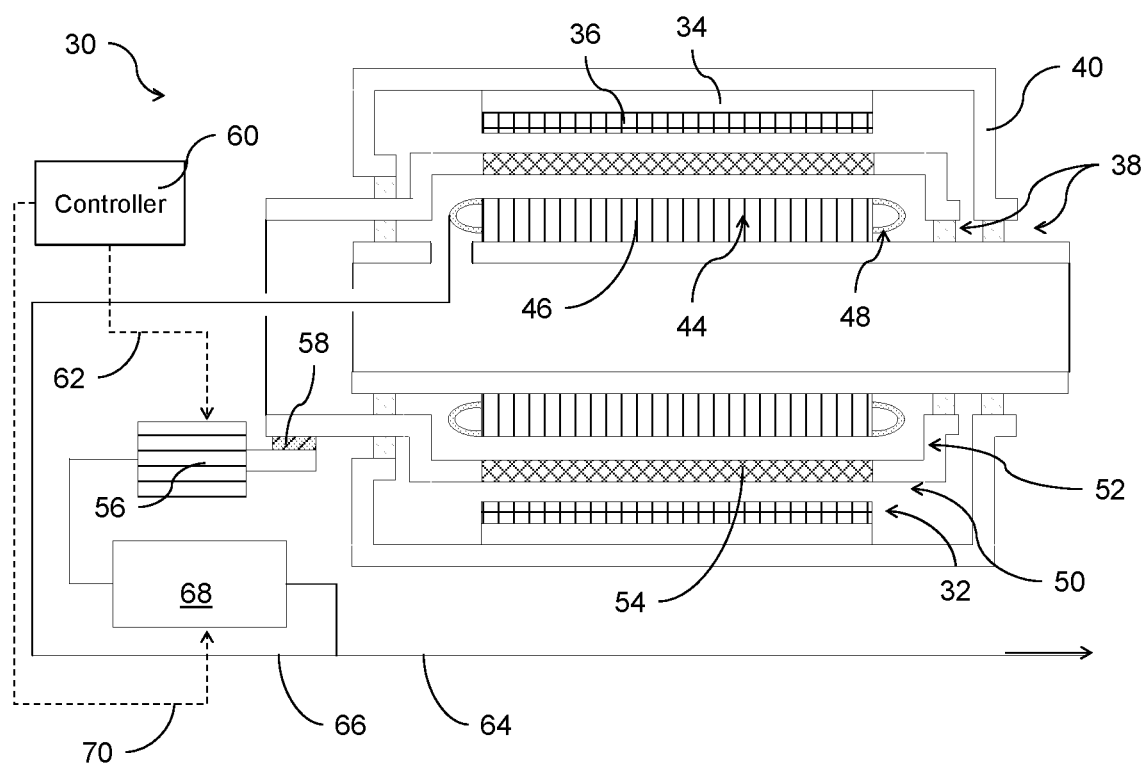
FIG. 5 is a schematic cross-section of an electrical machine according to the present invention.

FIG. 5 shows a radial flux electrical machine 30 according to the present invention in the 'inside out' configuration. In this arrangement the stator 44 is radially inside the permanent magnet rotor 32. The housing 40 may be integral with the permanent magnet rotor 32 and thus rotate therewith, or may be stationary with the permanent magnet rotor 32 rotating inside it. The inter-pole rotor 52 is located in the air gap 50 between the permanent magnet rotor 32 and the stator 44 as in FIG. 3 and FIG. 4.

The power output 64 and optional power feedback 66 to the converter 68 are shown in FIG. 5 for use when in the generating mode. However, as will be apparent the optional features may be omitted.

The arrangement of FIG. 5 operates in the same manner as the arrangement of FIG. 3 and FIG. 4. Thus the inter-pole rotor 52 sets the gear ratio of the electrical machine 30 and can be rotated to change the gear ratio. Advantageously a wide speed range can be facilitated in a relatively small machine without sacrificing power capability, or a high torque capability can be provided at lower speeds.

Figure 6:
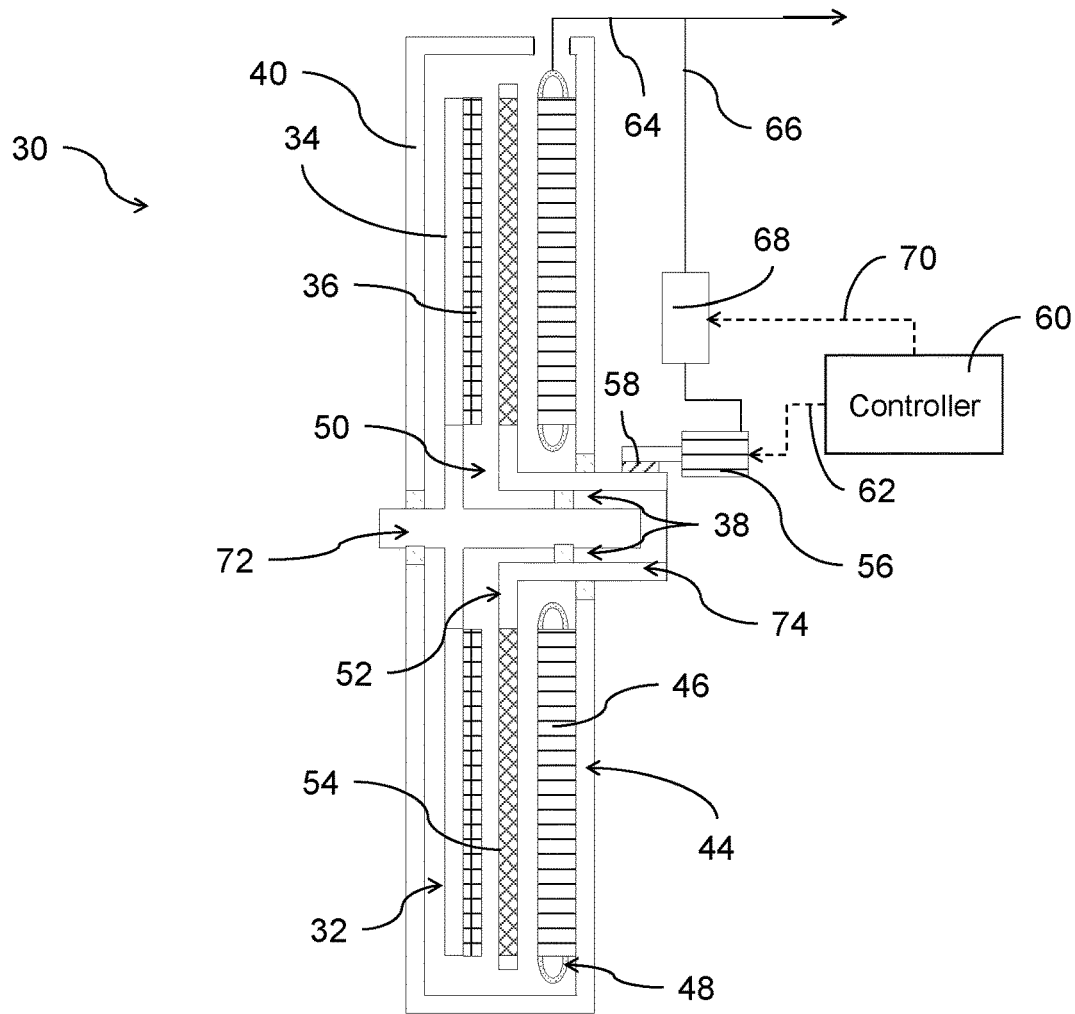
FIG. 6 is a schematic cross-section of an axial electrical machine according to the present invention.

FIG. 6 shows an axial flux electrical machine 30 according to the present invention. In this arrangement the stator 44 is axially beside the permanent magnet rotor 32. The permanent magnet rotor 32 is mounted to or integral with a shaft 72 which is coupled to the drive shaft 42 (not shown). The inter-pole rotor 52 is located in the air gap 50 between the permanent magnet rotor 32 and the stator 44 as in the radial flux electrical machine 30. Similarly, the inter-pole rotor 52 is mounted to or integral with an inter-pole shaft 74 which in turn is coupled to the drive motor 56. There may be mechanical gears and/or bearings 58 between the inter-pole shaft 74 and the drive motor 56 as in previous arrangements. Suitable bearings 38 may be provided between the housing 40, inter-pole shaft 74 and rotor shaft 72.

The power output 64 and optional power feedback 66 to the converter 68 are shown in FIG. 6 for use when in the generating mode. However, as will be apparent the optional features may be omitted.

The axial flux electrical machine 30 arrangement of FIG. 6 operates in the same manner as the radial flux electrical machine 30 previously described. Thus the inter-pole rotor 52 sets the gear ratio of the electrical machine 30 and can be rotated to change the gear ratio. Advantageously a wide speed range can be facilitated in a relatively small machine without sacrificing power capability, or a high torque capability can be provided at lower speeds. Advantageously the axial flux configuration is beneficial where the length of the electrical machine 30 is constrained but its diameter is not.

Figure 7:
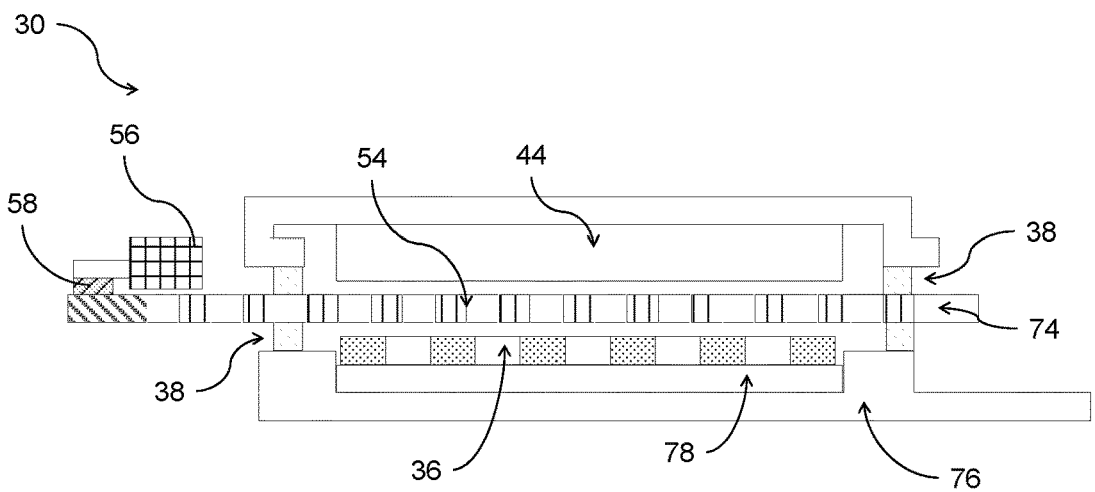
FIG. 7 is a schematic cross-section of a linear electrical machine according to the present invention.

FIG. 7 shows a linear electrical machine 30 according to the present invention. The stator 44 is as described in previous examples, except that it is elongate rather than annular and the windings 48 are orientated into and out of the page as illustrated. The permanent magnet rotor 32 is replaced by an elongate permanent magnet shaft 76 to which is mounted a magnetic core 78 and permanent magnets 36. The permanent magnet shaft 76 is configured to translate relative to the stator 44, sideways as illustrated, and may be supported by suitable bearings 38. The inter-pole rotor 52 is replaced by an inter-pole shaft 74 to which is mounted an array of inter-pole pieces 54. The array is a linear array. The inter-pole shaft 74 is elongate and arranged to translate, sideways as illustrated, rather than to rotate. The inter-pole shaft 74 may be supported from the housing by suitable bearings 38.

The windings 48 of the stator 44 generate the second magnetic field which oscillates in a linear sense. The inter-pole pieces 54 act to modulate the magnetic field. The modulated magnetic field interacts with first magnetic field generated by the permanent magnets 36 to cause the permanent magnet shaft 76 to translate in motor mode or to react to the translation of permanent magnet shaft 76 applied externally in generator mode.

The drive motor 56 may take the form of a worm gear or similar arrangement. It causes linear translation movement of the inter-pole shaft 74 and thus of the inter-pole pieces 54. By the linear movement of the inter-pole pieces 54 relative to the stator 44 and permanent magnet shaft 76 the magnetic fields are altered in an analogous manner to the radial and axial flux electrical machines 30 described above. Thus the inter-pole shaft 74 sets the gear ratio of the electrical machine 30 and can be translated to change the gear ratio. Advantageously a wide speed range can be facilitated in a relatively small machine without sacrificing power capability, or a high torque capability can be provided at lower speeds.

Advantageously the electrical machine 30 of the present invention has relatively simple bearings 38 because only the permanent magnet rotor 32 and the inter-pole rotor 52 rotate, or translate in the linear machine. In previous variable gear ratio magnetic gearing arrangements a further rotor has been provided so there were three independently rotating components with bearings between them.

Advantageously the electrical machine 30 of the present invention has only one set of permanent magnets 36 which act in both the torque generation and gearing functions. Thus there are fewer magnets 36 than in previous magnetically geared arrangements. Consequently the electrical machine 30 is cheaper than previous machines, experiences reduced losses and has lower thermal management requirements.

Advantageously the efficiency of the electrical machine 30 can be optimised by modifying the effective gear ratio. In particular the distribution of losses within the electrical machine 30 can be controlled by the modulation of the gear ratio so that the losses are preferentially incurred in locations which are easier to cool. For example, the permanent magnet rotor 32 may be operated at a lower speed so that the losses are reduced in the permanent magnets 36, which are difficult to cool due to retention banding. Instead the inter-pole pieces 54 may be arranged to incur greater losses because they are more easily cooled.

Advantageously the losses between the electrical machine 30 and the main converter (used to condition power to or from the stator windings 48) can also be balanced to accommodate the available cooling. Thus the sub-system as a whole may be optimised instead of just the electrical machine 30 at the expense of associated components.

Although three-phase power output 64 has been described, the electrical machine 30 may supply single phase or multi-phase power in generating mode. Similarly the stator windings 48 may be configured to receive three-phase, single phase or multi-phase power in a motoring mode of operation.

Although permanent magnets 36 have been described, alternative magnetic sources may be substituted. For example, electromagnets may be used. The electrical machine therefore has the form of a variable gear ratio wound-field synchronous machine.

The electrical machine 30 of the present invention finds utility in a variety of applications. For example, when operating as a motor the electrical machine 30 is effective as a high torque, low speed drive for hybrid or marine propulsion. Marine propulsion applications may include pod propulsors; fixed, retractable and azimuthing thrusters; and direct shaft line propulsion. The electrical machine 30 may be mounted horizontally or vertically, the latter being particularly beneficial for certain types of thrusters.

When operating as a generator the electrical machine 30 is effective in applications where there is a low drive motor speed, for example in wind or tidal power generation. The magnetic gearing reduces the torque requirement on the machine and consequently reduces the necessary weight and size of the machine. Advantageously the magnetic gear functionality of the electrical machine 30 can offer a substantially constant output frequency despite a varying input drive speed as is often experienced due to the unsteady nature of wind and waves. Advantageously the output power quality is thus raised and/or more consistent.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An electrical machine comprising:
   a moveable permanent magnet component configured to generate a first magnetic field;
   a stator comprising windings configured to excite a second magnetic field; and
   a moveable inter-pole component located between the permanent magnet component and the stator, the inter-pole component comprising an array of magnetic inter-pole pieces; wherein the speed of movement of the inter-pole component is controlled to set a magnetic gear ratio between the first and second magnetic fields, wherein a drive motor is configured to drive the inter-pole component, wherein the speed of movement of the inter-pole component is controlled to set the magnetic gear ratio between the first and second magnetic fields.

2. An electrical machine as claimed in claim 1 wherein the electrical machine is configured as one of a generator or a motor.

3. An electrical machine as claimed in claim 1 wherein the inter-pole pieces comprise soft iron.

4. An electrical machine as claimed in claim 1 wherein the inter-pole pieces form a regular array.

5. An electrical machine as claimed in claim 1 wherein the permanent magnet component comprises an array of magnets configured to generate the first magnetic field.

6. An electrical machine as claimed in claim 5 wherein the magnets comprise any one of: permanent magnets; electromagnets.

7. An electrical machine as claimed in claim 1 wherein an output of the stator is coupled to power electronics and arranged to provide drive to the inter-pole component.

8. An electrical machine as claimed in claim 1 wherein a drive shaft is configured to drive the permanent magnet component and a drive motor is configured to drive the inter-pole component.

9. An electrical machine as claimed in claim 1 further comprising a controller configured to control the speed of movement of the inter-pole component to set the magnetic gear ratio.

10. An electrical machine as claimed in claim 1 wherein the electrical machine comprises a radial flux machine, wherein the permanent magnet component comprises a permanent magnet rotor and the inter-pole component comprises an inter-pole rotor; the radial flux machine having the stator located radially inside the permanent magnet rotor.

11. An electrical machine as claimed in claim 1 wherein the electrical machine comprises a radial flux machine, wherein the permanent magnet component comprises a permanent magnet rotor and the inter-pole component comprises an inter-pole rotor; the radial flux machine having the stator located radially outside the permanent magnet rotor.

12. An electrical machine as claimed in claim 1 wherein the electrical machine comprises an axial flux machine, wherein the permanent magnet component comprises a permanent magnet rotor and the inter-pole component comprises an inter-pole rotor.

13. An electrical machine as claimed in claim 10 wherein the permanent magnet rotor comprises an annular array of magnets configured to generate the first magnetic field; the stator comprises an annular array of windings; and the inter-pole rotor comprises an annular array of inter-pole pieces.

14. An electrical machine as claimed in claim 1 wherein the electrical machine comprises a linear electrical machine.

15. An electrical machine as claimed in claim 14 wherein the permanent magnet component comprises a linear array of magnets configured to generate the first magnetic field; the stator comprises a linear array of windings; and the inter-pole component comprises a linear array of inter-pole pieces; and wherein the permanent magnet component and inter-pole component are each configured to move in a linear manner.

16. A gas turbine engine incorporating an electrical machine as claimed in claim 1.

17. A propulsor or thruster incorporating an electrical machine as claimed in claim 1.

18. An electrical machine as claimed in claim 11 wherein the permanent magnet rotor comprises an annular array of magnets configured to generate the first magnetic field; the stator comprises an annular array of windings; and the inter-pole rotor comprises an annular array of inter-pole pieces.

19. An electrical machine as claimed in claim 12 wherein the permanent magnet rotor comprises an annular array of magnets configured to generate the first magnetic field; the stator comprises an annular array of windings; and the inter-pole rotor comprises an annular array of inter-pole pieces.

* * * * *